United States Patent [19]
Zipperer, III

[11] 3,962,823
[45] June 15, 1976

[54] PLANTING BAG

[76] Inventor: John O. Zipperer, III, P.O. Box 640 Peck at Broadway, Fort Myers, Fla. 33301

[22] Filed: Dec. 30, 1974

[21] Appl. No.: 537,415

[52] U.S. Cl.................................. 47/37; 47/34.11; 229/55; 229/87 P; 206/423
[51] Int. Cl.² ..................... A01C 11/02; A01G 9/02; B65D 85/50; B65D 65/28
[58] Field of Search....................... 47/34.11, 34, 37; 206/45.33, 216, 805, 415, 423; 229/66, 87 P, 53–60, 62–63; 222/107, 62; 220/87; 24/16–19; D9/249

[56] References Cited
UNITED STATES PATENTS

| | | | |
|---|---|---|---|
| 2,539,372 | 1/1951 | Metzler | 206/805 |
| 2,949,370 | 8/1960 | Hughes | 229/87 F |
| 3,331,105 | 7/1967 | Gordon | 24/16 PB |
| 3,524,279 | 8/1970 | Adams | 47/37 |
| 3,733,745 | 5/1973 | Ingerstedt et al. | 47/37 |

*Primary Examiner*—Edgar S. Burr
*Assistant Examiner*—James R. Feyrer
*Attorney, Agent, or Firm*—Clarence A. O'Brien; Harvey B. Jacobson

[57] ABSTRACT

A planting bag in the form of a tube constructed from a flexible material and having a pair of sealed ends is advantageously provided with indicia which facilitates opening of a portion of the tube to form an opening bordered by a liquid retaining lip. One of the ends of the tube forms an endless member which may be severed from the bag and arranged around the tube at the opening therein for retaining the tube in a predetermined shape. In this manner, the packaging for soil, mulch, growing material, and the like, may be employed for the planting and growing of plants, with the interior of the bag capable of holding water, liquid fertilizer, and the like.

6 Claims, 7 Drawing Figures

PLANTING BAG

BACKGROUND OF THE INVENTION

1. Field of the Invention

This invention relates generally to structure for raising plants, and particularly to a planting bag which may be used as a package for plant growing materials prior to the use thereof for the growing of plants.

2. Description of the Prior Art

It is known to provide plant cultivating devices including soil-like material in which seeds, and the like, are implanted. These cultivating devices, however, are generally in the form of a canister or similar container intended specifically for a plant cultivating function. Thus, these known plant cultivating devices are constructed in such a manner as not to be necessarily suitable for handling of the soil-like material prior to its cultivating application, and the like.

Prior patents believed pertinent to the present invention are as follows:

| | |
|---|---|
| 1,994,333 | Mar. 12, 1935 |
| 2,684,807 | July 27, 1954 |
| 2,745,754 | May 15, 1956 |
| 3,189,253 | June 15, 1965 |
| 3,680,256 | Aug. 1, 1972 |
| 3,819,316 | June 25, 1974 |

SUMMARY OF THE INVENTION

It is an object of the present invention to provide a package for soil, mulch, growing material, and the like, which may also be used as a planting bag.

It is another object of the present invention to provide a package suitable for modification by an ultimate user so as to permit the package to function as a planting bag that holds water, liquid fertilizer, and the like.

These and other objects are achieved according to the present invention by providing a planting bag having: a tube provided with a pair of normally open ends sealed for forming a closed container; advantageously certain indicia provided on the tube for facilitating opening of a portion of the tube; and an endless member formed at one of the ends of the tube and removable therefrom and arranged around the tube for retaining a predetermined shape of the tube. Advantageously, the tube is constructed from a flexible, non-self-supporting material, and the endless member, being part of the tube, is constructed from a light material.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a planting bag according to the present invention in its original state as a package for compost, and the like.

DESCRIPTION OF THE PREFERRED EMBODIMENT

Figure 1:
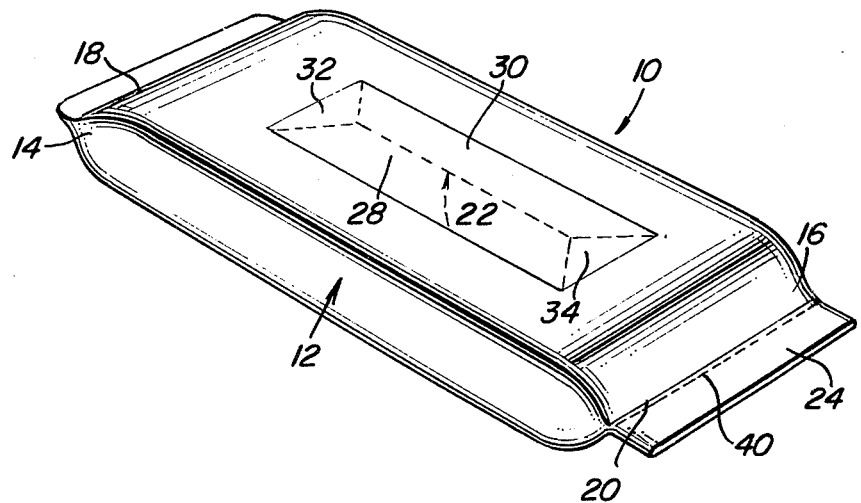

Referring now more particularly to FIG. 1 of the drawings, a planting bag 10 according to the present invention comprises a tube 12 having a pair of normally open ends 14 and 16 sealed in a suitable, known manner for forming a closed container. It will be appreciated that the closing of ends 14 and 16 as by the planar sleeves 18 and 20 will form a bag such as is commonly employed for packaging granular and particulate materials. Indicia 22 is advantageously provided on tube 12 for facilitating opening of a portion of the tube to form an opening to be described in greater detail below. An endless member 24 is formed at one of the ends of the tube, at end 16 as illustrated, by that portion of the tube which extends outwardly from the associated seam 20 and the enclosed portion of the tube 12. This endless member is removable from end 16 of tube 12 for being arranged around the central, or median portion, of tube 12 for retaining a predetermined shape of tube 12.

As will be readily appreciated, tube 12 is advantageously constructed from a suitable, known flexible, non-self-supporting material, and endless member 24, being part of tube 12, is also constructed from the same flexible, non-self-supporting material. Examples of materials suitable for fabricating bag 10 are polyethylene and water-resistant paper.

Figure 2:
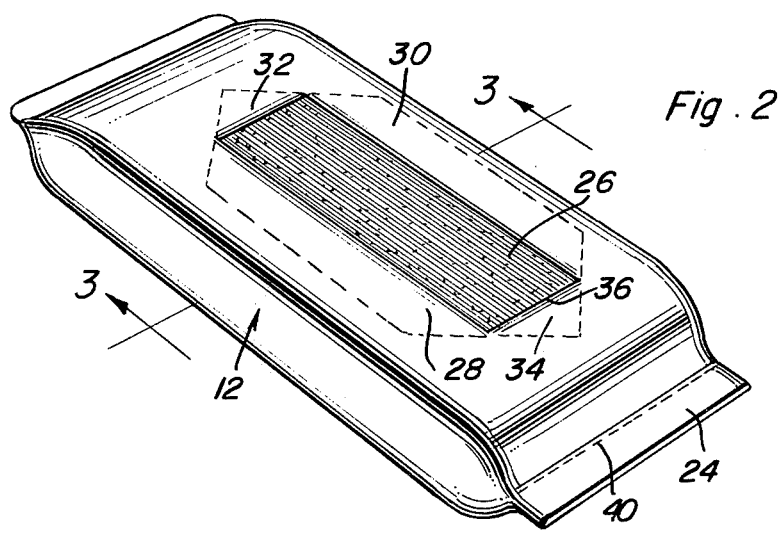
FIG. 2 is a perspective view showing the planting bag of FIG. 1 with an opening formed in the uppermost side thereof.
Figure 3:
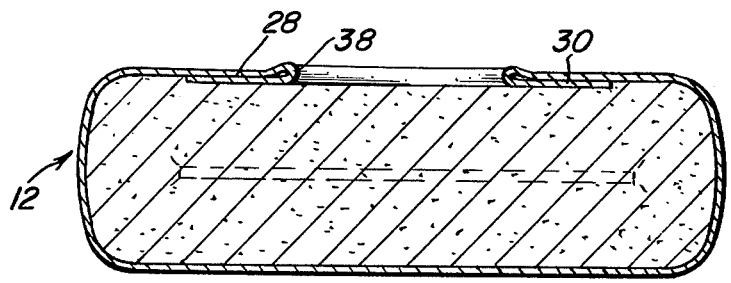
FIG. 3 is a sectional view taken generally along the line 3–3 of FIG. 2.
Figure 4:
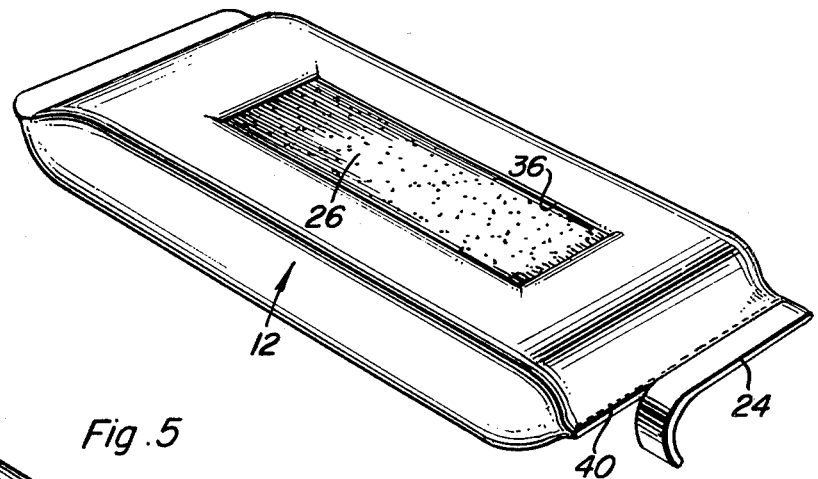
FIG. 4 is a perspective view showing the planting bag of FIGS. 1 and 2 with the endless member in the process of being severed from the bag.

Bag 10 as shown in FIG. 1 is prepared for planting, or similar use, by first laying bag 10 on a level surface and shaking out the bag for distributing evenly a compost 26 (FIG. 2) contained in the bag. By the word "compost" is meant, for example, the soil, mulch, and growing material commonly employed for growing plants, and the like. Once the bag is properly laid out, cuts are made along indicia 22 for creating flaps 28, 30, 32, and 34. These flaps, once cut, are folded inside tube 12 as shown in FIGS. 2 and 3 of the drawings for producing an opening 36 defined by a liquid retaining lip 38. While opening 36 is illustrated as having a rectangular configuration, it will be appreciated that any suitable configuration may be substituted for that shown.

Figure 5:
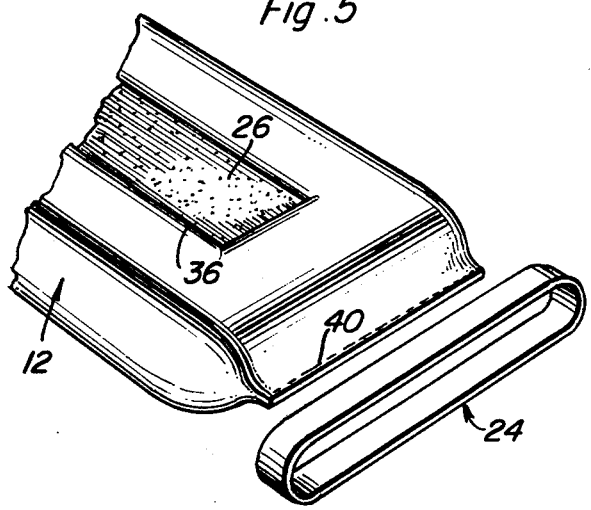
FIG. 5 is a fragmentary, perspective view similar to FIG. 4, but showing the endless member completely served from its associated end of the bag.
Figure 6:
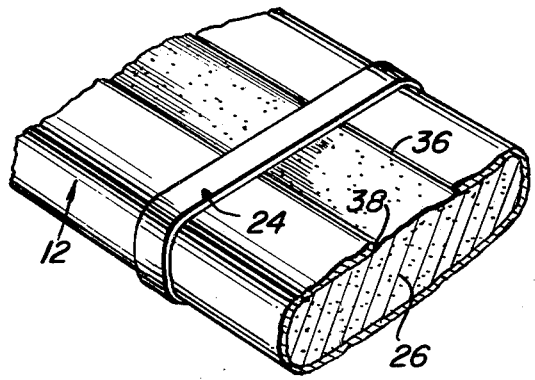
FIG. 6 is a fragmentary, perspective sectional view, showing the endless member arranged about the bag of FIGS. 1 through 5.

Once opening 36, and its associated lip 38, have been formed in tube 12 by the creation of flaps 28, 30, 32, and 34, endless member 24 may be severed from end 16 of tube 12 in an appropriate manner, such as by cutting or tearing along the, for example, dotted line 40. It will be appreciated that perforations, and the like, could also be employed to facilitate separation of member 24 from the main portion of tube 12. Further, since seam 20 is arranged between member 24, and line 40, and the main portion of tube 12, end 16 of tube 12 will remain sealed. Once member 24 has been severed from tube 12, it may be opened as shown in FIG. 5 of the drawings and slipped around tube 12 so as to be positioned substantially in the median portion of tube 12 as shown in FIG. 6. This arrangement of member 24 permits the non-self-supporting bag 10 to retain the shape thereof while it is being used for plant cultivation, and the like. Appropriate plants and/or seeds may be planted in compost 26 by means of the access to the compost provided by opening 36. Further, water, liquid fertilizer, and any other appropriate liquids may be poured into the compost 26 through opening 36 as desired and considered necessary, and will be retained in the planting bag by the lip 38 surrounding the opening 36.

As can be readily understood from the above description and from the drawings, when planting bag 10 is properly prepared for use it will take the form of a tube 12 having a pair of spaced, sealed ends 14, 16 with portions of tube 12 being cut for forming flaps 28, 30, 32, and 34 folded into tube 12 and providing an opening 36 in the bag which is defined by a liquid retaining lip 38 created by the folds of the flaps. Further, an endless member 24 is arranged around tube 12 in the vicinity of opening 36 for retaining tube 12 in a predetermined shape.

Figure 7:
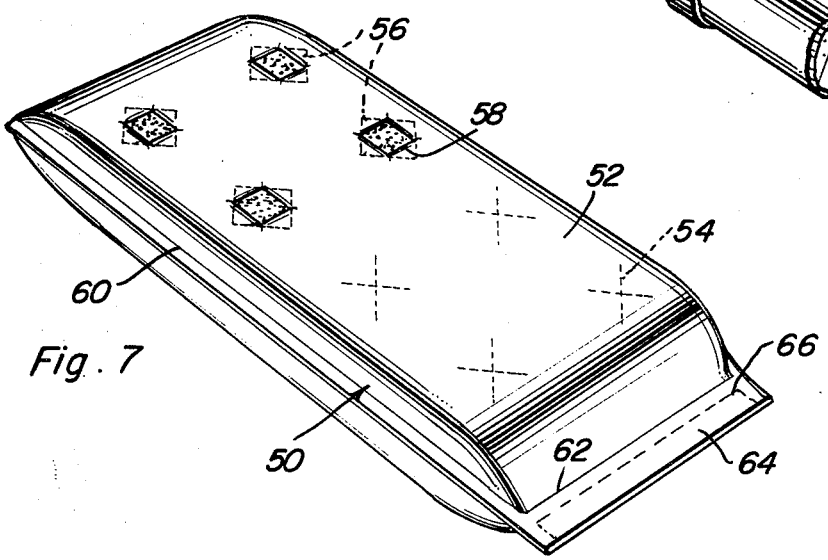
FIG. 7 is a perspective view of a modified form of the bag.

FIG. 7 illustrates a perspective view of a modified embodiment of the planting bag generally designated by numeral 50 in which the top panel 52 is provided with a plurality of crossed lines 54 indicating cutting lines. Eight crossed lines 54 are illustrated but it is pointed out that the number of crossed lines may vary depending upon the size of the bag and depending upon number of plants to be grown in each bag. In using the embodiment of the invention, it is placed on an even surface in the same manner as the embodiment illustrated in FIGS. 1–6 and a knife or other instrument may be used to cut X-shaped slits in the top panel 52 of the bag 50 and the triangular flaps defined by forming the slits are folded inwardly in underlying relation to the top panel 52 as indicated by numeral 56 thus providing a plurality of substantially square openings 58 in the top panel 52.

In forming the bag, the crossed lines 54 may be formed continuously in the bag forming material such as polyethylene or other suitable thermoplastic material or the like in which the two side edges and top of the bag are provided with seams 60 and 62 which may be heat sealed when plastic material is used or may be stitching if paper, fabric or other material is used. The end seam 62 is provided with an extension 64 separated from the seam 62 along a line of severance 66 which may be a dotted line or a perforated line to enable the endless tubular extension 64 to be separated from the end of the bag either by tearing along the perforated line without using any cutting instrument or by cutting along a dotted line 66.

With this construction, a plurality of plants may be grown in isolated relation to each other and if it is desired to separate the plants, the bag and the compost or plant growth supporting material within the bag may be severed so that the plants may be easily transplanted, sold or otherwise individually propagated or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A planting bag, comprising, in combination:
    a. a sealed bag forming a closed container, said bag constructed from a flexible, non-self-supporting material;
    b. indicia means provided on the bag for facilitating the formation of a single large rectangular opening in the bag of more than one-half the size of the bag by cutting along the indicia means, said indicia delineating flaps formed when the bag is cut when forming the opening, said flaps being foldable inwardly into underlying relation to the adjacent portion of the bag to define a lip around the opening; and
    c. means provided for positioning around the central portion of the bag for retaining the bag in a predetermined shape once the opening is made therein and to prevent deformation of the bag when liquids are added thereto through said opening, comprising; an endless member, severable from the bag and constructed from the same material as the bag for positioning around the central portion of the bag.

2. A planting bag, comprising, in combination:
    a. a tube having a pair of spaced, sealed ends and arranged forming a container, portions of the tube being cut for forming flaps folded into the tube and providing a large opening in the bag of more than one-half the size of the bag defined by a liquid retaining lip formed by the folds of the flaps; and
    b. means provided to retain the bag in a predetermined shape and to prevent deformation of the bag when liquid is added thereto through said opening including an endless member arranged around the tube and across the opening and in a plane transverse to an extent of the tube between the ends thereof for retaining the tube in a predetermined shape.

3. A structure as defined in claim 2, wherein the opening in the bag has a rectangular configuration.

4. A structure as defined in claim 3, wherein the tube is constructed from a flexible, non-self-supporting material, and the endless member, being part of the tube, is also constructed from a flexible, non-self-supporting material.

5. A structure as defined in claim 2, wherein the tube is constructed from a flexible, non-self-supporting material, and the endless member, being part of the tube, is also constructed from a flexible, non-self-supporting material.

6. A method of preparing a planting bag for use, comprising the steps of:
    a. laying on a level surface a bag formed by a non-self supporting tube sealed at the ends thereof, and shaking the bag for distributing more evenly a compost contained in the bag;
    b. cutting portions of the tube along pre-provided indicia on said tube for creating flaps, and folding the flaps inside the tube for producing an opening bordered by a liquid retaining lip formed by the folds of the flaps; and
    c. severing an endless member from one of the ends of the tube, and slipping the severed member around the tube in the direction of extent of the tube between the ends and positioning the member in substantially the median portion of the tube for retaining the shape of the bag when same is in use and to prevent the bag from deforming when liquid is added for growing purposes.

* * * * *